United States Patent [19]

Yip

[11] Patent Number: 5,664,483

[45] Date of Patent: Sep. 9, 1997

[54] ELECTRIC TOASTER

[75] Inventor: Kit Chuen Yip, Kowloon, Hong Kong

[73] Assignee: G.E.W. Corporation Limited, Kowloon, Hong Kong

[21] Appl. No.: 680,994

[22] Filed: Jul. 16, 1996

[51] Int. Cl.[6] .................................................. A47J 37/08
[52] U.S. Cl. ............................ 99/391; 99/385; 99/389; 99/393; 99/399
[58] Field of Search ........................... 99/327, 329 R, 99/329 P, 329 RT, 331–333, 385–402; 219/386, 521, 537, 528, 529, 405, 411, 413, 492

[56] References Cited

U.S. PATENT DOCUMENTS

| | | | |
|---|---|---|---|
| 4,290,349 | 9/1981 | Fiorenza | 99/388 |
| 4,577,550 | 3/1986 | Maroti et al. | 99/329 RT |
| 4,735,855 | 4/1988 | Younger | 99/391 |
| 4,972,768 | 11/1990 | Basora San Juan | |
| 5,072,662 | 12/1991 | Yip | 99/327 |
| 5,121,678 | 6/1992 | Del Fresno | 99/393 X |
| 5,181,455 | 1/1993 | Masel et al. | 99/389 X |
| 5,216,944 | 6/1993 | Trujillo | 99/385 X |
| 5,309,826 | 5/1994 | Ortiz | 219/521 X |
| 5,317,960 | 6/1994 | Cumfer | 99/399 X |
| 5,423,246 | 6/1995 | McNair et al. | 99/334 |
| 5,487,328 | 1/1996 | Fujii | 99/390 |

FOREIGN PATENT DOCUMENTS

| | | |
|---|---|---|
| 034463 | 8/1981 | European Pat. Off. |
| 312640 | 4/1989 | European Pat. Off. |
| 1552878 | 9/1979 | United Kingdom |
| 2133281 | 7/1984 | United Kingdom |

Primary Examiner—Timothy F. Simone
Attorney, Agent, or Firm—Gunn, Lee & Miller, PC

[57] ABSTRACT

An electric toaster which comprises a body having a compartment (20) for accommodating a slice of bread, a vertically movable support for supporting a said slice of bread in the compartment (20), an operating member (36/42) operable to move the support downwards, heating elements provided on opposite sides of the compartment (20) for heating a said slice of bread, and a movable holder (16 & 18) having opposite sides (16 & 18) supported for movement towards each other upon operation of the operating member (36/42) in order to hold therebetween a said slice of bread in a stationary position between the heating elements. Each said holder side (16/18) has upper and lower end portions which are guided to move along respective slots (28).

11 Claims, 3 Drawing Sheets

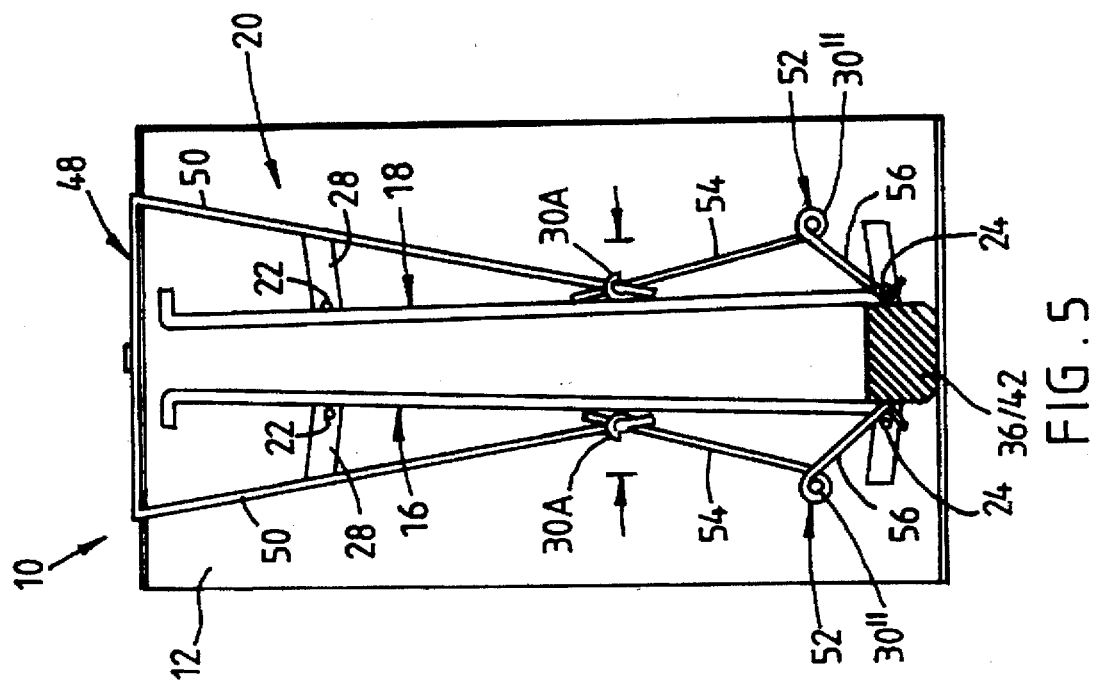
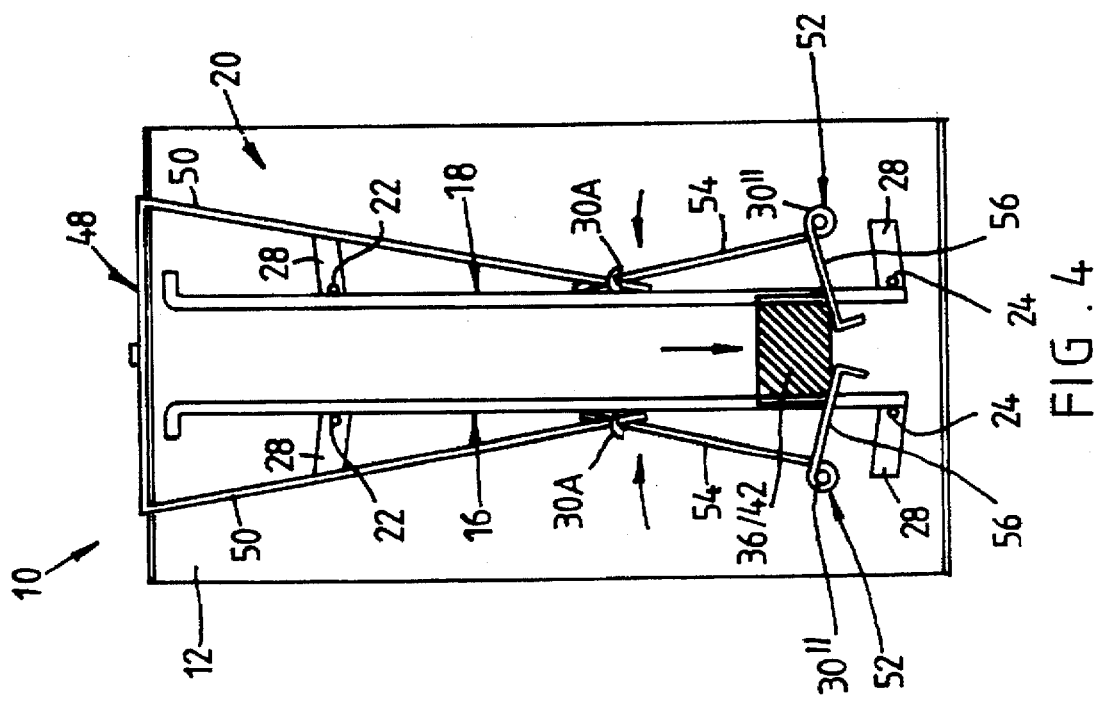

ELECTRIC TOASTER

The present invention relates to an electric toaster.

BACKGROUND OF THE INVENTION

Existing electric toasters have a compartment to hold a slice of bread for toasting by heating elements provided on opposite sides of the compartment. The compartment is made sufficiently wide so as to be able to accommodate slices of bread of a certain range of thickness. Normally, the slice of bread is loosely held inside the compartment and this results in undesirable uneven toasting on opposite sides of the bread slice.

The invention seeks to mitigate or at least alleviate such a problem.

SUMMARY OF THE INVENTION

According to the invention, there is provided an electric toaster which comprises a body having a compartment for accommodating a slice of bread, a vertically movable support for supporting a said slice of bread in the compartment, an operating member operable to move the support downwards, heating elements provided on opposite sides of the compartment for heating a said slice of bread, and a movable holder having opposite sides supported for movement towards each other upon operation of the operating member in order to hold therebetween a said slice of bread in a stationary position between the heating elements, each said holder side having upper and lower end portions which are guided to move along respective slots.

It is preferred that the holder is arranged to be moved at an intermediate position between the upper and lower end portions of the holder sides.

In a preferred construction, each holder side has, extending from one end to the other end thereof, a rigid member for strengthening the holder side.

More preferably, each rigid member is provided at an intermediate position between the upper and lower end portions of the corresponding holder side, and each holder side is arranged to be moved at one end of the respective rigid member.

In a preferred embodiment, the holder is in the form of a wire frame which also serves as a guard for a said slice of bread against the heating elements.

More preferably, the holder is provided by a pair of wire frames on opposite sides of the compartment between the heating elements.

It is preferred that the holder is arranged to be operated by the operating member by means of a spring.

More preferably, the spring is provided by an elbow spring for each holder side, which elbow spring has a first limb engaged with the holder side and a second limb lying in the path of movement of a part of the operating member.

Preferably, the holder sides are, when they are closest together, included with each other at a small angle to taper upwards.

It is preferred that the holder sides are resiliently urged apart by a spring.

Preferably, the holder is adapted to hold a said slice of bread in a substantially vertical position.

BRIEF DESCRIPTION OF DRAWINGS

The invention will now be more particularly described, by way of example only, with reference to the accompanying drawings, in which:

FIG. 4 corresponds to FIG. 3, showing a subsequent condition in which the operating member moves further downwards to move the wire frames laterally closer towards each other; and FIG. 5 corresponds to FIG. 4, showing a further subsequent condition in which the operating member moves to a lowermost position and the wire frames are moved thereby laterally closest to each other.

DETAILED DESCRIPTION OF PREFERRED EMBODIMENT(S)

Figure 1:
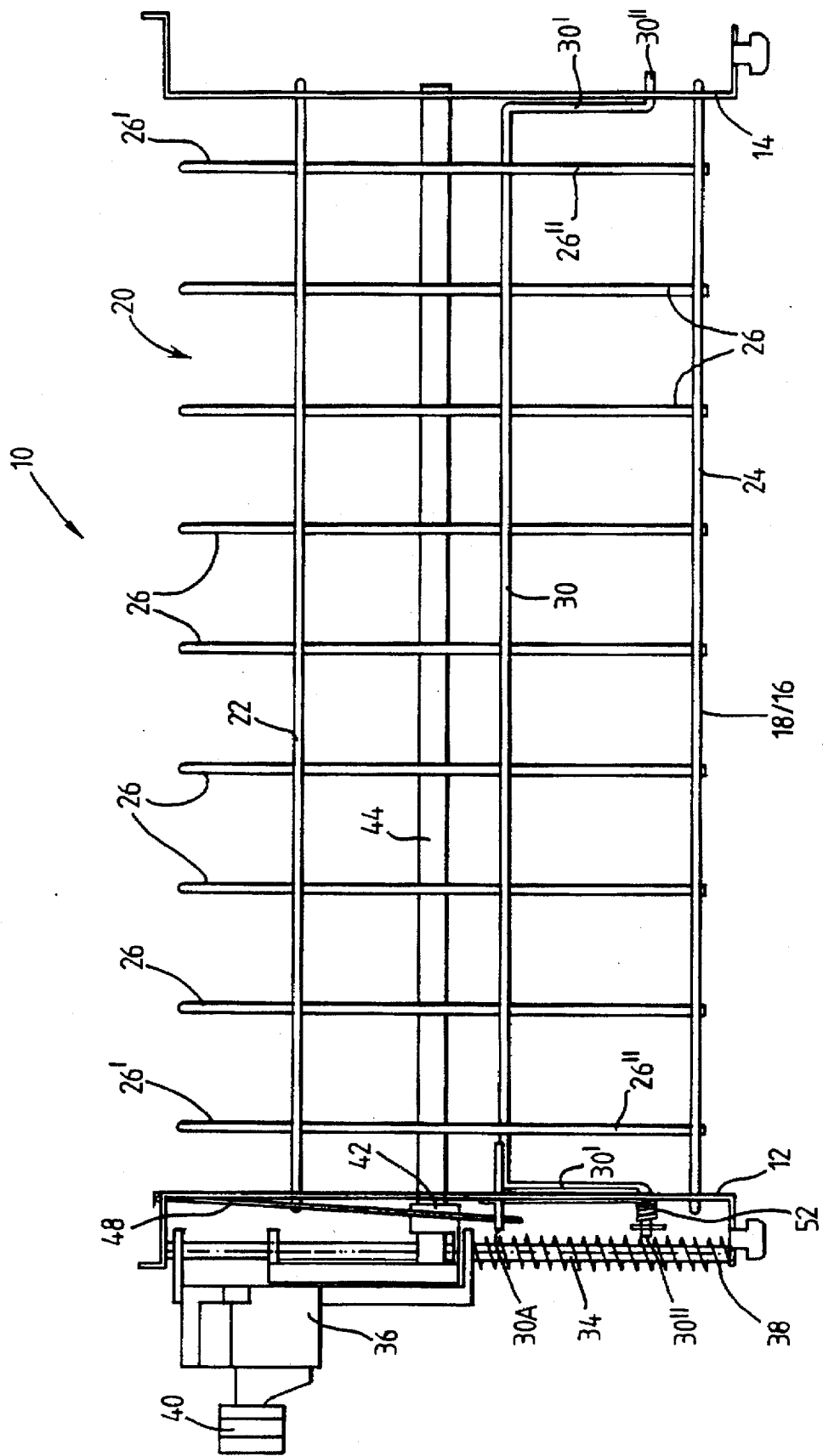
FIG. 1 is a side view of a bread-holding mechanism provided inside an embodiment of an electric toaster in accordance with the invention, said mechanism having a pair of side wire frames and an operating member.
Figure 2:
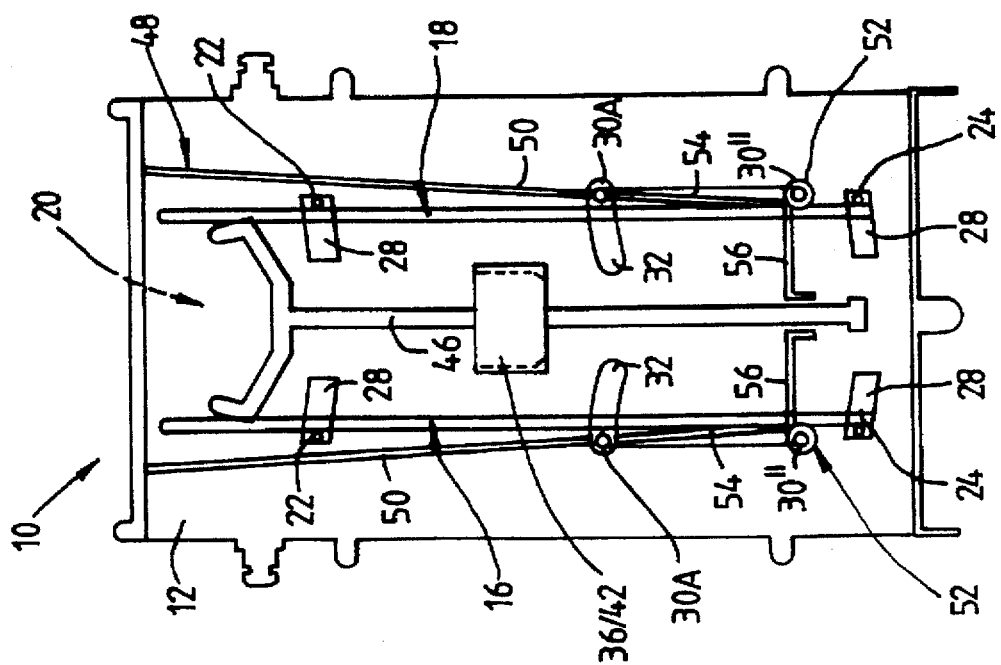
FIG. 2 is an end view of the mechanism of FIG. 1, showing the operating member in an uppermost position between the wire frames.

Referring firstly to FIGS. 1 and 2 of the drawings, there is shown a bread-holding mechanism 10 of an electric toaster embodying the invention, which mechanism 10 includes a pair of stationary end (bracket) plates 12 and 14 provided inside opposite ends of a body casing (not shown) of the toaster. A pair of confronting, generally planar wire frames 16 and 18 are loosely supported on opposite sides of the mechanism 10, extending from one end plate 12/14 to the other end plate 14/12. Although this is not shown in the drawings, the body casing has a slot provided in its top side at a position directly above the space occupied by the end plates 12 and 14 and the wire frames 16 and 18, said space defining a bread compartment 20 which is accessible through the top slot opening.

Each wire frame 16/18 is formed by a pair of upper and lower horizontal metal rods 22 and 24 and nine vertical metal rods 26 welded at regular intervals across the pair of horizontal rods 22 and 24. The end plates 12 and 14 movably support the wire frames 16 and 18 by having slots 28 (slightly inclined to horizontal) loosely receiving corresponding opposite ends of the horizontal rods 22 and 24. Vertical rods 26' at opposite ends of each wire frame 16/18 have respective slightly offset intermediate portions 26" to define a horizontal passage with the other vertical rods 26 between them (looking from either end in the direction along the plane of the wire frame 16/18) for loosely receiving an intermediate horizontal metal rod 30 which forms part of the wire frame 16/18.

Opposite ends of each intermediate rod 30 are bent vertically downwards to form a pair of legs 30' having respective toes 30" which pass through individual circular holes in the corresponding end plates 12 and 14 such that the intermediate rod 30 is pivotable sideways with respect to the end plates 12 and 14. Such pivotal movement of the intermediate rods 30 will cause the corresponding wire frames 16 and 18 to move laterally with the ends of their horizontal rods 22 and 24 sliding along the associated slots 28 on the end plates 12 and 14.

Each intermediate rod 30 has an end extension 30A which passes through a corresponding arcuate slot 32 provided in the end plate 12, for access on the outer side of the end plate 12.

The end plate 12 mounts, on the outer side thereof, a stationary vertical shafts 34. A two-part operating bracket 36 is slidably supported on the shaft 34 for vertical movement therealong, which is resiliently biassed upwards by a compression coil spring 38 disposed on the lower half of the shaft 34. The bracket 36 has an outer part in the form of a press-knob 40 which is exposed on the exterior of the toaster body casing, for pressing by a user. The bracket 36 has an inner part in the form of a generally rectangular tile 42 adjacent the end plate 12. A horizontal elongate bread support 44 is mounted on the bracket 36 in a cantilever manner. The bread support 44 passes through the tile 42 and a vertical central slot 46 in the end plate 12 into the compartment 20, extending from the rear end to the far end of the compartment 20 at a central position between the wire frames 16 and 18, for supporting a slice of bread inside the compartment 20.

Heating elements (not shown) of equal rating are provided on opposite sides of the compartment 20, for heating a slice of bread supported on the bread support 44, at the same distance behind the corresponding wire frames 16 and 18. As one of their functions, the wire frames 16 and 18 serve to guard the slice of bread against the heating elements.

The wire frames 16 and 18 are resiliently biassed laterally apart by an inverted U-shaped spring 48. The spring 48 is placed close on the outer side of the end plate 12, and has a pair of depending side limbs 50 engaging through the end extensions 30A of the corresponding wire frames 16 and 18. Also close on the outer side of the end plate 12, an elbow spring 52 is disposed on the toe 30" of each wire frame 16/18. Each elbow spring 52 has a vertical limb 54 engaging through the end extension 30A of the associated wire frame 16/18 and a horizontal limb 56 extending inwards reaching just short of the slot 46 of the end plate 12, into the path of movement of the tile 42.

The bracket 36 is movable downwards by means of the press-knob 40 to lower the bread support 44 in order to place the supported slice of bread wholly into the compartment 20. At the lowermost position, the bracket 36 closes a first electrical switch to turn on the heating elements and a second switch to energise an electro-magnet to hold the bracket 36 and hence the bread support 44 against the action of the spring 38. Upon the elapse of a certain time period determined by a timer, a circuit including the electro-magnet is opened to permit the bracket 36 and bread support 44 to return to the original uppermost position by the spring 38.

Figure 3:
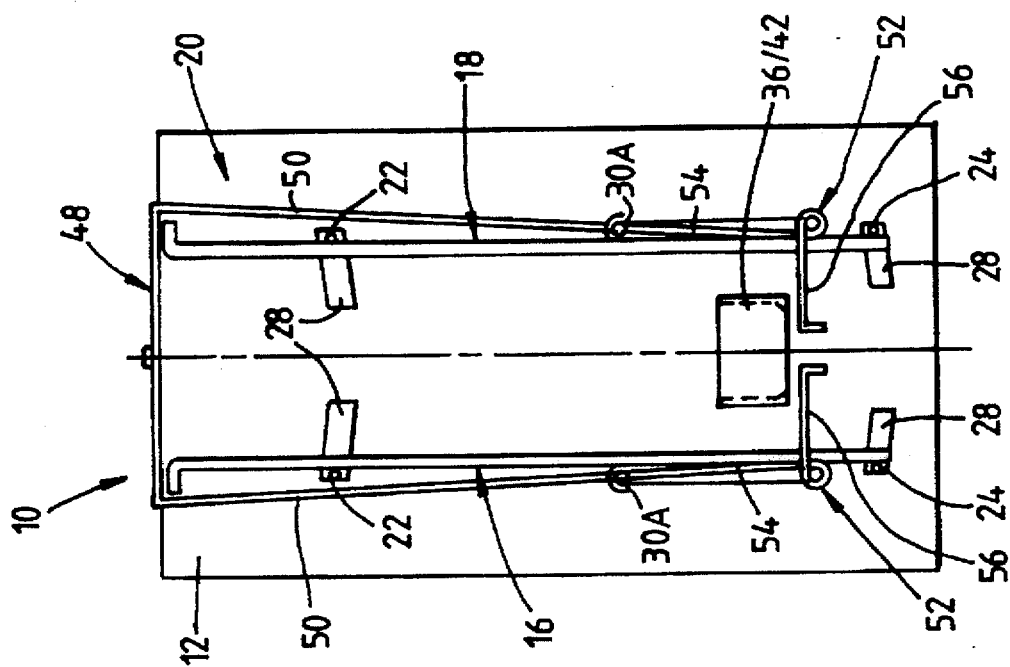
FIG. 3 corresponds to FIG. 2, showing the operating member moving downwards.

Referring now to FIGS. 3 to 5 of the drawings, when the bracket 36 moves downwards, the tile 42 approaches the horizontal limbs 56 of the springs 52 (FIG. 3) and eventually engages and pushes to swing them open (FIG. 4). Downward swinging of the horizontal limbs 56 causes the corresponding vertical limbs 54 to pivot inwards (with slight angular expansion of the springs 52), thereby moving the associated wire frames 16 and 18 laterally towards each other, via the corresponding intermediate rods 30, against the action of the spring 48. The wire frames 16 and 18 move closest to each other and stop (FIG. 5) when the ends of their upper and lower rods 22 and 24 reach the inner ends of the associated slots 28 on the end plates 12 and 14. At this moment, the springs 52 further expand angularly to permit the tile 42 to move further downwards passing the horizontal limbs 56 until the bracket 36 reaches the lowermost position (FIG. 5).

In this condition, the wire frames 16 and 18 are inclined with each other at a very small angle to slightly taper upwards, with the their upper rods 22 closer to each other than their lower rods 24.

In actual use, a slice of bread (of an average thickness) will, upon lowering of the bread support 44, be clamped by and between the wire frames 16 and 18 into a central stationary position between the heating elements for even toasting on opposite sides. Under this condition, the wire frames 16 and 18 urge resiliently (under the action of the springs 52) against opposite sides of the bread slice so as to hold the same in position. The wire frames 16 and 18 may not normally reach the closest position shown in FIG. 5, unless the slice of bread is thin enough. The wire frames 16 and 18 also serve to protect the bread slice from the heating elements.

It is envisages that the wire frames 16 and 18 may be provided by opposite sides of a single U-bent wire frame, or may take any other suitable forms.

The invention has been given by way of example only, and various other modifications of and/or alterations to the described embodiment may be made by persons skilled in the art without departing from the scope of the invention as specified in the appended claims.

What is claimed is:

1. An electric toaster comprising a body having a compartment for accommodating a slice of bred, a vertically movable support for supporting a said slice of bread in the compartment, an operating member operable to move the support downwards, heating elements provided on opposite sides of the compartment for heating a said slice of bread, and a movable holder having opposite sides supported for movement towards each other upon operation of the operating member in order to hold therebetween a said slice of bread in a stationary position between the heating elements, each said holder side having upper and lower end portions which are guided to move along respective slots.

2. An electric toaster as claimed in claim 1, wherein the holder is arranged to be moved at an intermediate position between the upper and lower end portions of the holder sides.

3. An electric toaster as claimed in claim 1, wherein each holder side has, extending from one end to the other end thereof, a rigid member for strengthening the holder side.

4. An electric toaster as claimed in claim 3, wherein each rigid member is provided at an intermediate position between the upper and lower end portions of the corresponding holder side, and each holder side is arranged to be moved at one end of the respective rigid member.

5. An electric toaster as claimed in claim 1, wherein the holder is in the form of a wire frame which also serves as a guard for a said slice of bread against the heating elements.

6. An electric toaster as claimed in claim 5, wherein the holder is provided by a pair of wire frames on opposite sides of the compartment between the heating elements.

7. An electric toaster as claimed in claim 1, wherein the holder is arranged to be operated by the operating member by means of a spring.

8. An electric toaster as claimed in claim 7, wherein the spring is provided by an elbow spring for each holder side, which elbow spring has a first limb engaged with the holder side and a second limb lying in the path of movement of a part of the operating member.

9. An electric toaster as claimed in claim 1, wherein the holder sides are, when they are closest together, inclined with each other at a small angle to taper upwards.

10. An electric toaster as claimed in claim 1, wherein the holder sides are resiliently urged apart by a spring.

11. An electric toaster as claimed in claim 1, wherein the holder is adapted to hold a said slice of bread in a substantially vertical position.

* * * * *